Oct. 2, 1962 R. M. NARDONE 3,056,624
CARGO HOOK DEVICE
Filed March 7, 1960 4 Sheets-Sheet 1
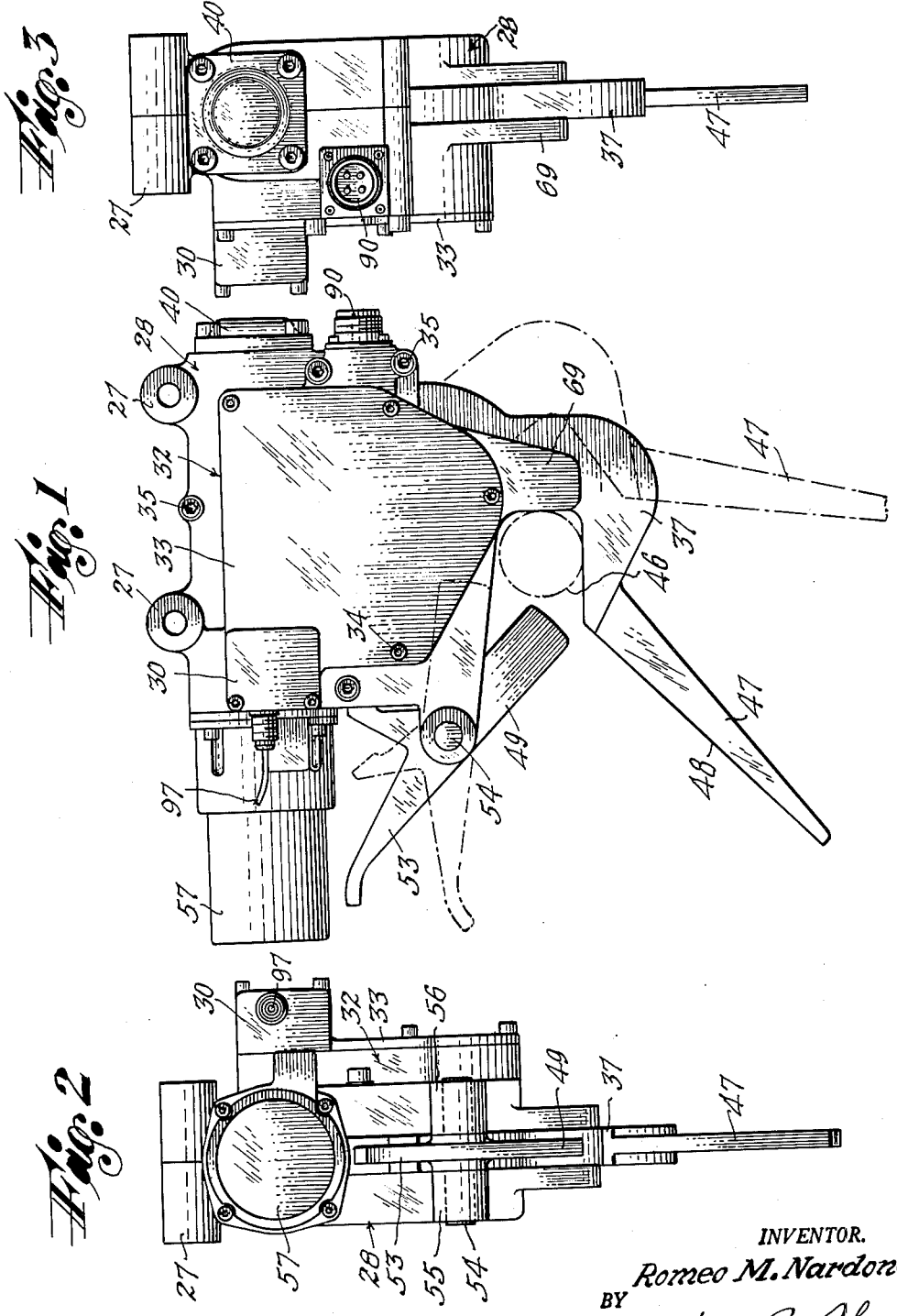
INVENTOR.
Romeo M. Nardone
BY
Harry B. Cook,
ATTORNEY Oct. 2, 1962 R. M. NARDONE 3,056,624
CARGO HOOK DEVICE
Filed March 7, 1960 4 Sheets-Sheet 2
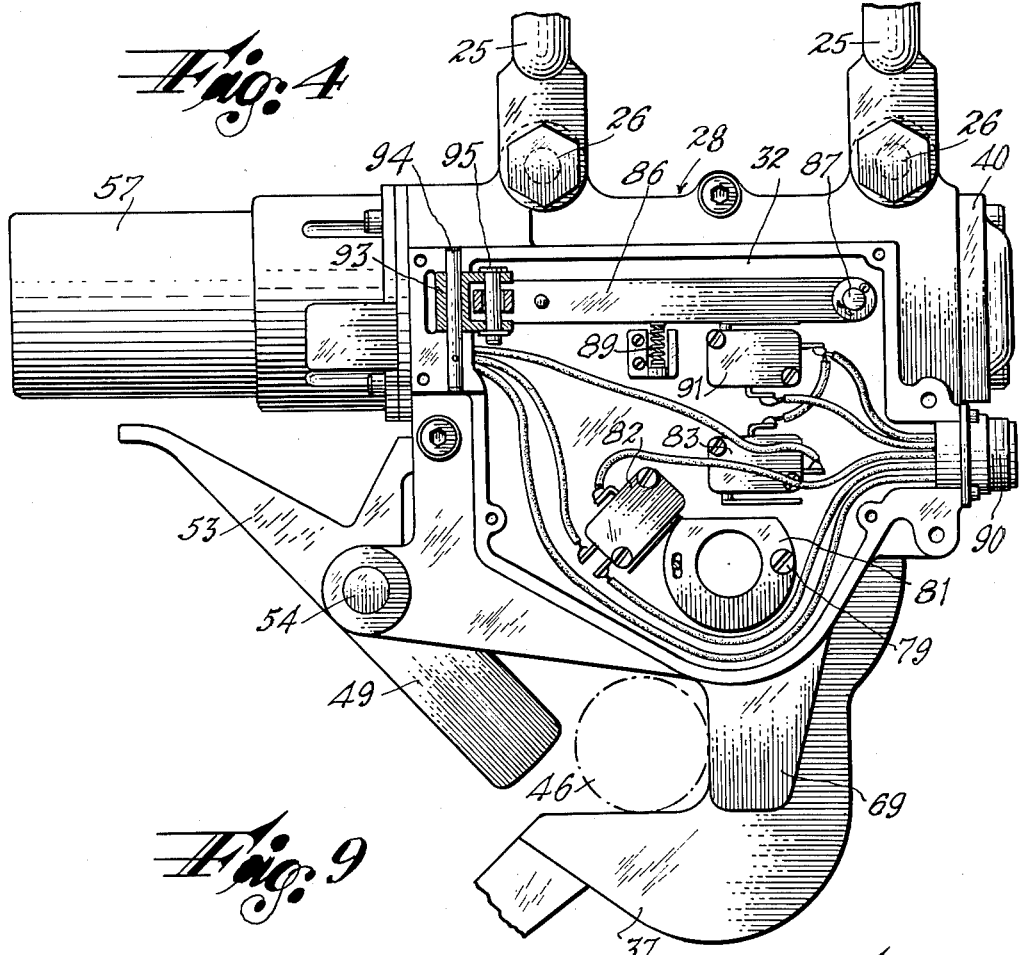
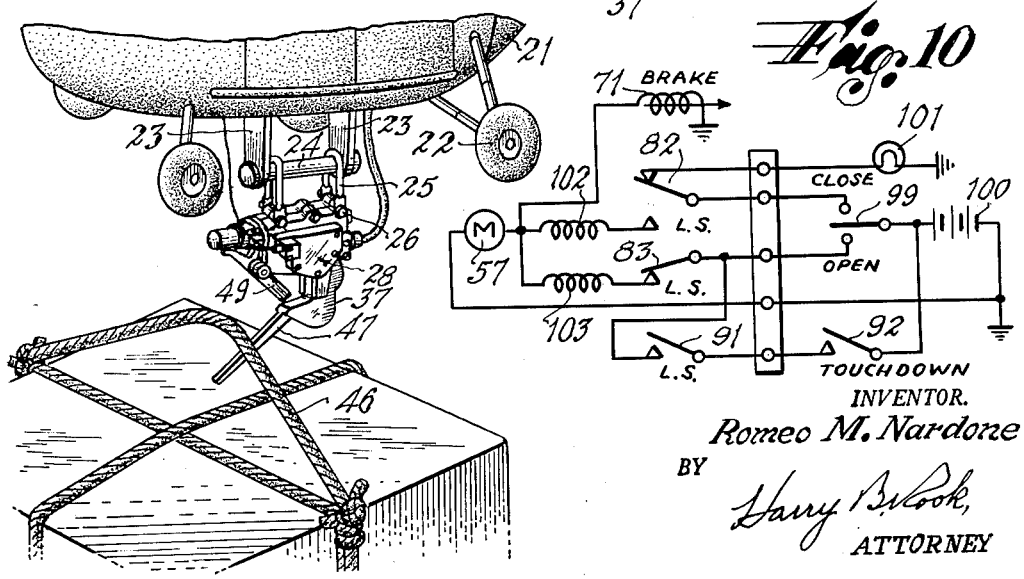
INVENTOR.
Romeo M. Nardone
BY
Harry B. Cook,
ATTORNEY

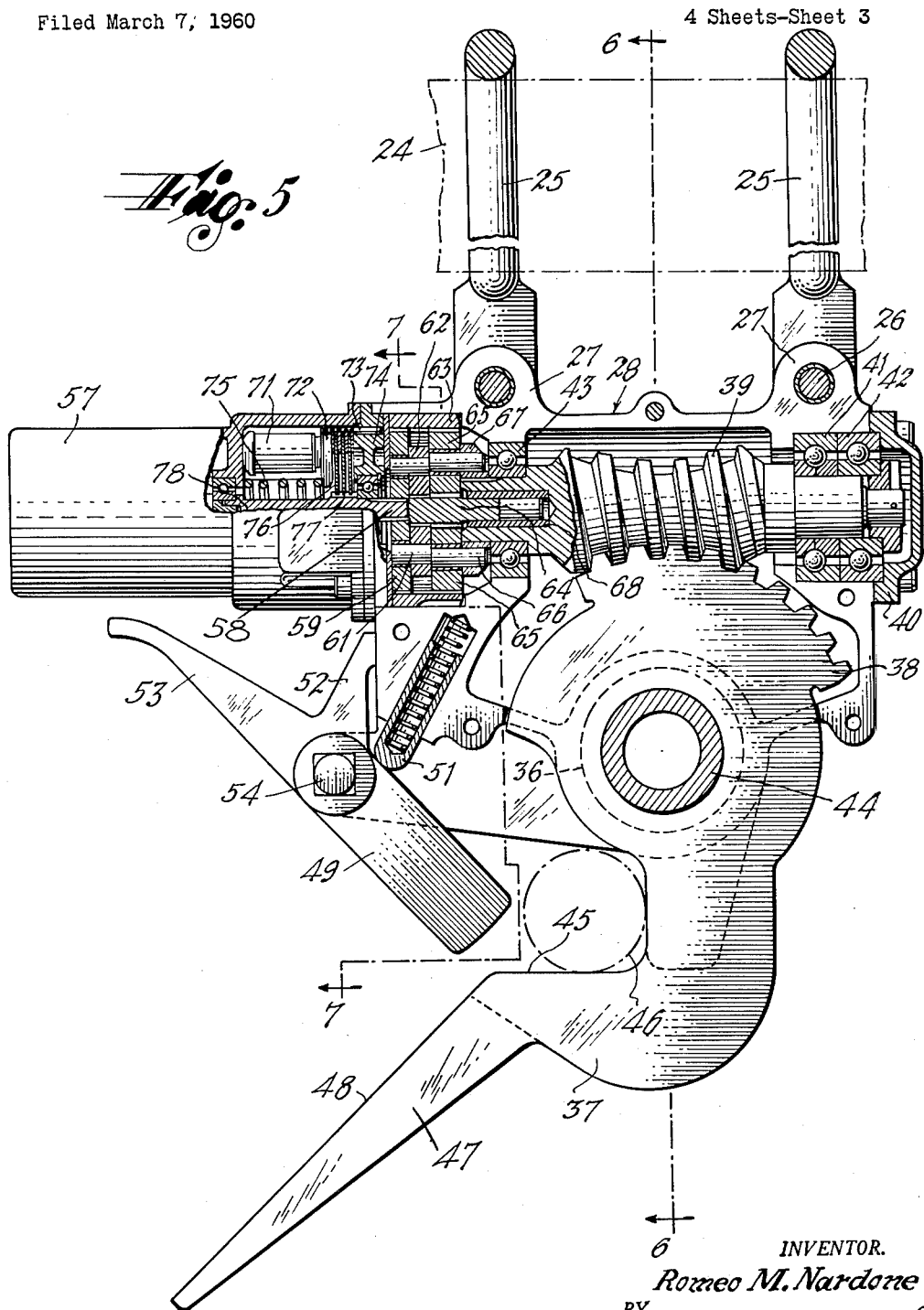

Oct. 2, 1962 — R. M. NARDONE — 3,056,624
CARGO HOOK DEVICE
Filed March 7, 1960 — 4 Sheets-Sheet 4
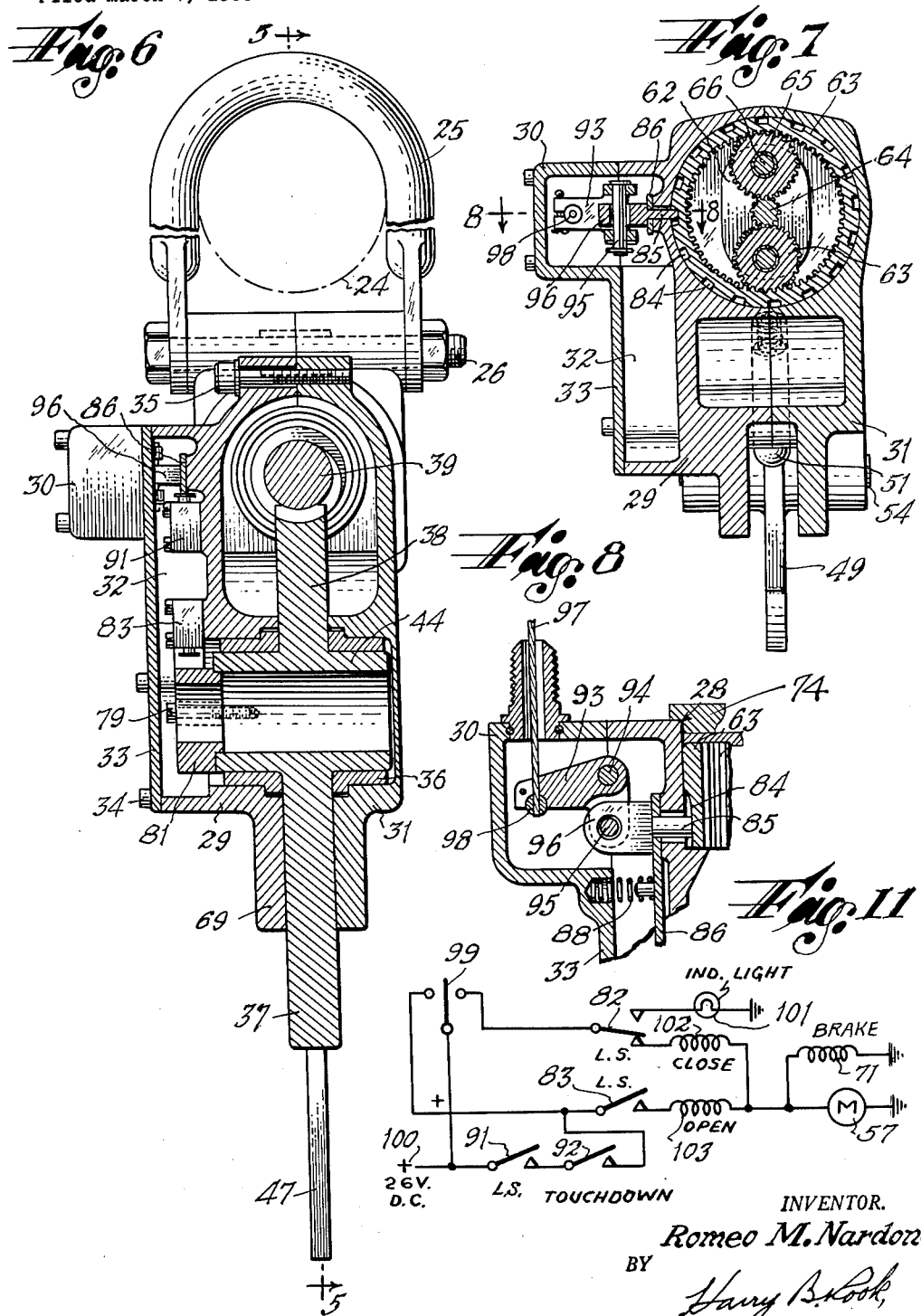
INVENTOR.
Romeo M. Nardone
BY
Harry B. Rook
ATTORNEY United States Patent Office 3,056,624
Patented Oct. 2, 1962

3,056,624
CARGO HOOK DEVICE
Romeo M. Nardone, 19 Ox Bow Lane, Summit, N.J.
Filed Mar. 7, 1960, Ser. No. 13,331
8 Claims. (Cl. 294—83)

This invention relates to cargo hook devices and, more particularly, to one intended for application to the lower part of a helicopter for flying into a cargo sling, hooking into it, lifting and transporting the cargo to a desired location, and releasing it from the hook, either in flight or when the cargo touches the ground.

The usual cargo hook of a helicopter is of such a construction that it must be manually operated to close it after the cargo sling has been properly installed. The person doing the operation must necessarily be directly under the helicopter. This is obviously a dangerous position to by in. Such hooks are opened by the operation of a solenoid to release a latch which holds the load hook in place. Vibration and/or acceleration forces frequently act to move the latch and drop the cargo unintentionally.

In accordance with the present invention, I have devised a cargo hook device such that a helicopter can fly over the cargo and hook onto the sling, cargo ring, or to other cargo supporting means, which means is then automatically secured against release by a spring-loaded latch forming part of the hook assembly. Operation is through an electric motor geared to the load hook and a spring-loaded motor brake holds the hook from opening.

An object of my invention is to provide a cargo hook device particularly adapted for use with a helicopter, but not limited thereto, in which the cargo load can be hooked on while the helicopter or other moving took-carrying object is in flight.

Another object of my invention is to provide a cargo hook device operable by an electric motor to close or release the hook, or by hand to release the hook in case of power failure.

A further object of my invention is to provide a cargo hook device which automatically latches in the cargo and which may release the same automatically upon its touching the ground, or manually.

These and other objects and advantages will become apparent from the following detailed description when taken with the accompanying drawings. It will be understood that the drawings are for purposes of illustration and do not define the scope or limits of the invention, reference being had for the latter purpose to the appended claims.

In the drawings, wherein like reference characters denote like parts in the several views:

FIGURE 1 is a side elevational view of a cargo hook device embodying my invention.

FIGURE 2 is an end elevational view from the left of that of FIGURE 1.

FIGURE 3 is an end elevational view from the right of that of FIGURE 1.

FIGURE 4 is a view on an enlarged scale, corresponding to FIGURE 1 and showing some of the interior mechanism upon removal of an outer plate thereof.

FIGURE 5 is a view corresponding to FIGURE 4 but showing other interior mechanism, upon removal of the near part of the housing, with parts in section on the line 5—5 of FIGURE 6, in the direction of the arrows.

FIGURE 6 is a transverse sectional view on the line 6—6 of FIGURE 5, in the direction of the arrows.

FIGURE 7 is a transverse sectional view on the line 7—7 of FIGURE 5, in the direction of the arrows.

FIGURE 8 is a fragmentary horizontal sectional view on the line 8—8 of FIGURE 7, in the direction of the arrows, with parts omitted.

FIGURE 9 is a perspective view showing the bottom portion of a helicopter with a cargo hook embodying my invention suspended therefrom and in the act of picking up a cargo or load.

FIGURE 10 is a wiring diagram showing the limit switches in position for opening the cargo hook.

FIGURE 11 is a wiring diagram generally similar to that of FIGURE 10, with the limit switches set for closing the cargo hook.

Referring to the drawings in detail, like parts being designated by like reference characters, and first considering FIGURE 9, there is shown the lower portion of a helicopter generally designated 21, having landing wheels 22 and brackets 23 depending from the bottom of the body. Through said brackets extends a bolt or pin 24 on which are, in turn, suspended a pair of U-bolts or clevises 25. The lower ends of said clevises 25 are apertured and receive bolts 26, FIGURES 4, 5 and 6, which pass therethrough and through upstanding lugs 27 on the housing 28 of a cargo hook device embodying my invention, for the support of the same from the helicopter.

As best seen in FIGURES 5 and 6, the housing 28 consists of two parts, 29 and 31, separated along a normally vertical axial plane. The front or near part 29 as viewed in FIGURES 1 and 4, is provided with a mechanism compartment 32 which is normally closed by a plate 33 with an outwardly projecting hollow boss or housing portion 30, and secured to said front part 29 of the housing 28 by tap bolts or the like 34. The parts 29 and 31 of the housing are secured together in any appropriate manner, as by means of tap bolts 35.

Pivoted in bearings 36 in the housing 28 is the load hook 37 formed as a part of, or desirably integral with, a sector 38 of a worm wheel. Engaging the sector 38 is a drive worm 39, journalled in the housing 28 at one end on angular contact ball bearings 41 and 42 held in place by end cover 40, and at the other end on a steady rest ball bearing 43. The load hook is shown as shving an integral portion 44 forming a journal in the bearings 36. However, this portion 44 may, if desired, be formed as a separate hollow supporting shaft to which the hook 37 is keyed or otherwise connected. The lower portion of the hook 37 is provided with a flat normally horizontal surface 45 serving to support a load ring, cargo sling, or other cargo-supporting means 46. At the outer end portion of the surface 45 is provided an extension 47 forming the lower half of a guide member normally presenting a surface 48 sloping at approximately 45° from the horizontal, to guide the ring 46 to the hook 37.

The other half of the guide member is provided by a latch 49, spring loaded as through plunger 51, in order to tend to keep it in the position illustrated in FIGURES 4 and 5, where it closes the hook 37 and prevents unintentional removal of the ring 46. In order to limit downward movement of the latch 49, there is provided an extension 52 which when in normal position contacts the housing 28. A further upward extension 53 cooperates with the extension 47 by serving as a top guide for the load ring 46 upon taking on a load. The latch 49 is pivotally mounted on a shaft 54, the ends of which are supported in lugs 55 and 56 extending from the housing 28.

I have provided an electric motor 57 for operating the device. The armature shaft of thhe motor is provided with a drive pinion 58 engaging two or more planetary gears 59, desirably provided with bronze bushings and mounted on pins 61 secured to, as by pressing them into, a spider plate 62. The teeth of the planetary gears 59 also mesh with the teeth of an internal gear 63. Spider plate 62 has a pinion 64 secured thereto, which pinion meshes with two or more planetary gears 65 desirably provided with bronze bearings and supported on pins 66 secured to a ring 67, as by pressing them thereinto. The ring 67 is splined on, or otherwise secured to, the adjacent end portion of the worm 39, or journalled end portion or shaft thereof, in order to drive said worm at reduced speed, as compared with that of the motor. The pinion 64 is supported as in a bushing 68 located in a corresponding bore in the same worm 39. Upon energizing the motor 57, the hook 37 rotates, toward the dotted position of FIGURE 1, through an angle of 45° in less than one second to drop a load ring or the like 46. Extensions 69 on the bottom of the housing, in combination with the then generally vertical extension 47, provides a guide for forcing the ring 46 to drop vertically upon release.

In order to prevent undesired turning of the worm 39, I provide a heavy-duty solenoid 71 in shunt with the fields of the motor 57 so as to be energized whenever the motor is energized. The solenoid armature 72 is prevented from rotating by pins 73 pressed into plate 74. Said armature is loaded by a spring 75 to apply pressure on a multiplate brake 76. The inner discs 77 of this brake are splined to the motor armature shaft 78. This solenoid armature 72 is pulled toward the face of the solenoid, releasing the brake 76 and permitting free rotation of the motor armature and pinion 58 when the solenoid is energized. When the current to the motor 57 is shut off, the spring 75 presses the armature 72 against the brake plates to quickly stop and hold all moving parts. With a cargo load on hook 37, a reverse torque is applied to the worm 39 which, by virtue of the relatively steep pitch of its threads, is reversible from the wheel segment 38. The phrase: "relatively steep" means that the helix angle of the worm and pinion is greater than the friction angle; the gear set is not self-locking but is reversible. This reverse torque passes through the planetary reduction gear to the solenoid release brake. The braking force is, therefore, necessarily made great enough to hold the ultimate load that is on the hook 37.

Operable with the hook 37, as by being adjustably secured to the shaft portion 44 as by means of a screw 79 is a cam member 81 which serves to operate the limit switches 82 and 83. When the hook 37 is rotated counterclockwise so as to drop the load as it opens, the limit switch 83 is actuated to break the electric circuit to the motor 57. When the hook is closed, the limit switch 83 is again closed and the limit switch 82 opened to shut off the power to the motor.

The planetary internal gear 63 is free to rotate in the housing bore and has grooves 84 in its outer periphery. I have provided a pin 85, the inner end of which normally engages in one of these grooves, as shown most clearly in FIGURES 7 and 8, and has a small amount of free up and down movement in the housing 28. The pin 85 is secured to a lever 86, as by welding, which lever is loosely pivoted at 87, as shown most clearly in FIGURE 4. I have provided a spring 88 to urge the pin 85 into engagement with one of the grooves 84, the loose connection of the lever 86 on pin 87 permitting the necessary movement of the lever. There is also a spring 89 to urge the lever 86 and pin 85 upward to rotate the lever 86 clockwise about its hinge point, at the same time rotating the internal gear 63 to a slight extent and thereby causing the switch 91 to close an electrical circuit to the motor. The lever 86 pivoted at 87 is urged in a clockwise direction by spring 89 and in the reverse direction by the load on the hook transmitted as a torque on the internal gear 63 acting on the pin 85 which is welded to the lever 86.

As one mode of operation, the closure of switch 91 occurs when the load on the hook 37 is reduced to a small amount, as when the supported cargo touches the ground. At that time, the reverse torque on the internal gear 63 is reduced to a value small enough to permit the spring 89 to rotate the lever 86 against the torque due to the hook load. As soon as that happens, the motor starts to open the hook 37. This, however, is only possible if the touch-down switch 92 has been moved to closed position, see FIGURE 10. If all electrical power should fail and it should become necessary to drop the load, the same pin 85 may be manually pulled away, from its engagement in a groove 84, and thus release the internal gear, through the operation of a bell-crank lever 93 pivoted at 94 to the housing 28 and having a pin 95 extending through an enlarged hole in the head 96 of the pin 85. A flexible pull cable 97 is provided and secured to the bell crank lever 93, as by means of a ball 98 swaged to said cable. At that time, the lever 86 turns slightly about its hinge point 87.

The device heretofore described may be otherwise operated as follows: The touch-down switch 92 may be opened by the operator, as shown in FIGURE 11. The operating switch 99 is closed to right, as viewed in FIGURE 11, to energize the solenoid 71, release the brake 76, and actuate the hook-closing winding 102 of the motor 57 from a source of electric power 100 which may be connected through socket 90 and switch 82 to close the hook 37 or move it to the position of FIGURES 4 and 5, ready for a pick-up operation. The latch 49 always lies in the full-line position of FIGURE 1, ready for pick-up, being tripped to the dot-dash position during pick-up. The warning lamp 101 goes on when this closure occurs, as the switch 82 then moves from the position of FIGURE 11 to that of FIGURE 10, by operation of the cam 81.

In order to drop the cargo when the helicopter or the like is in flight, the operating switch 99 is moved to the down position of FIGURE 10 (corresponding to the left hand position of FIGURE 11), energizing the solenoid 71, releasing the brake 76, and sending current to the hook-opening winding 103 of the motor 57 through limit switch 83 until the cam 81 operates it to open the circuit when it reaches the release position illustrated by the dot-dash lines in FIGURE 1. During this operation, motion of the internal gear 63 does not matter since the limit switch 91 is not in the circuit involved.

As another alternative in case all electric power should fail and it becomes necessary to drop the cargo, the cargo or load may be dropped by manually pulling on the cable 97, thereby releasing the internal gear 63 which will then rotate freely on the reverse torque applied by the load to the worm 39 and gears 65, 64, spider plate 62 and gears 59, without turning the armature of the drive motor 57.

Changes and modifications may be made in the construction of the cargo hook without departing from the scope and spirit of the invention, as set forth in the following claims.

I claim:

1. A cargo hook device comprising a housing, a load hook pivotally mounted therein so that the load hook projects therebeneath, a latch member pivoted to said housing for when in a certain position closing the hook, after allowing a cargo support to enter the hook, an electric motor mounted in said housing, gearing driven by said motor for actuating said load hook including an internal gear rotatable in said housing having circumferentially spaced grooves on the periphery thereof, a pin slidably mounted in said housing spring biased to enter one of said grooves to hold the gear against rotation, a brake operable to prevent backward actuation of said gearing when the motor is deenergized, and means for releasing said pin from said internal gear to allow free rotation thereof and thereby permit the hook to open to drop the cargo.

2. A cargo hook device as recited in claim 1, wherein there is a spring-applied brake, a releasing solenoid to prevent turning of said motor until power is applied thereto, and means for connecting said motor and solenoid in parallel to a power source.

3. A cargo hook device as recited in claim 1, wherein there is reduction gearing between the motor and worm, which gearing includes said internal gear, inside planetary gears meshing therewith, said pin having an inner end portion engageable in one of said grooves, loosely fitting in said housing so as to be transversely movable by and upon slight rotation of said gear by lightening of the load, and a switch in circuit with said motor and closable upon each transverse movement to cause said hook to be operated by said motor.

4. A cargo hook device as recited in claim 3, wherein there is a manually controlled switch in the motor circuit through said last mentioned switch, to adjust the circuit for said motor operation.

5. A cargo hook device as recited in claim 3, wherein there is manually operable means for, independently of motor operation, releasing the pin from said internal gear to allow the hook to open.

6. A cargo hook device comprising a housing, a combined load hook and worm wheel segment pivotally mounted therein so that the load hook portion projects therebeneath, a worm meshing with said wheel segment and journalled in said housing, a reversible motor for driving said worm to operate said hook, reduction gearing including an internal gear, inside planetary gears meshing therewith, a spring applied brake to prevent turning of said motor until power is applied thereto, a releasing solenoid for said brake, means for connecting said motor and solenoid in parallel to a power source, circumferentially spaced grooves on the periphery of said internal gear, a pin with an inner end position spring actuated to engage in one of said grooves, loosely fitting in said housing so as to be transversely movable by said gear upon load lightening, a switch closable upon such transverse movement to cause said hook to be opened by said motor, a manually controlled switch in the motor circuit through said last-mentioned switch to adjust the circuit for said motor operation, and manually operable means for, independently of motor operation, releasing said pin from said internal gear to allow the hook, when loaded, to open.

7. A cargo hook device comprising a housing, a combined load hook and worm wheel segment pivotally mounted therein so that the load hook portion projects therebeneath, a lower extension on said hook portion for guiding cargo-supporting means thereinto, a latch member pivoted to said housing, spring-loaded to normally lie in hook-closing position, formed with one extension to cooperate with said hook portion extension as an upper guide for cargo-supporting means and another extension engageable with said housing to limit downward swinging of said latch beyond hook-closing position, a worm meshing with said wheel segment, having a thread of pitch steep enough to be turned by said wheel segment, and journalled in said housing, a reversible motor for driving said worm to release or close said hook, reduction gearing including an internal gear, inside planetary gears meshing therewith, a spring-applied brake to prevent turning of said motor until power is applied thereto, a releasing solenoid for said brakes, means for connecting said motor and solenoid in parallel to a power source, circumferentially spaced grooves on the periphery of said internal gear, a pin with an inner end portion spring-actuated to engage in one of said grooves, loosely fitting in said housing so as to be transversely movable by said gear upon load lightening, a switch closable upon such transverse movement to cause said hook to be opened by said motor, a manually-controlled switch in the motor circuit through said last-mentioned switch to adjust the circuit for said motor operation, and manually operable means for, independently of motor operation, releasing said pin from said internal gear to allow the hook when loaded to open.

8. A cargo hook device comprising a housing, a combined load hook and worm wheel segment pivotally mounted therein so that the load hook portion projects therebeneath, a latch member pivoted to said housing for when in a certain position closing the hook, after allowing a cargo support to enter said hook, a worm meshing with said wheel segment and journalled in said housing, an electric motor for driving said worm to actuate said hook, and a brake operable to prevent worm turning when said motor is de-energized, there being reduction gearing between the motor and worm, which gearing includes an internal gear, inside planetary gears meshing therewith, circumferentially spaced grooves on the periphery of said internal gear, a pin slidably mounted in the housing with an inner end portion spring actuated to engage in one of said grooves for holding the internal gear against rotation, and manually operable means for releasing said pin from said internal gear to allow the hook to open.

References Cited in the file of this patent

UNITED STATES PATENTS

| | | |
|---|---|---|
| 2,630,931 | Douglas | Mar. 10, 1953 |
| 2,746,583 | Blevins | May 22, 1956 |
| 2,931,231 | Felix | Apr. 5, 1960 |